US005204397A

United States Patent [19]

Maki et al.

[11] Patent Number: 5,204,397

[45] Date of Patent: Apr. 20, 1993

[54] METHOD FOR IMPROVING THE ELECTRIC CONDUCTIVITY OF RESIN

[75] Inventors: Hirohisa Maki, Shiga; Takeshi Fujita; Katsuaki Matsuo, both of Kyoto; Kenji Motogami, Osaka; Shigeo Mori, Kyoto, all of Japan

[73] Assignee: Dai-Ichi Kogyo Seiyaku Co., Ltd., Kyoto, Japan

[21] Appl. No.: 753,762

[22] Filed: Sep. 3, 1991

[30] Foreign Application Priority Data

Sep. 14, 1990 [JP] Japan .................................. 2-244661

[51] Int. Cl.[5] .......................... C08K 3/00; C08L 75/08

[52] U.S. Cl. .................................... 524/401; 524/155; 524/436; 524/590

[58] Field of Search ................ 524/155, 401, 436, 590

[56] References Cited

U.S. PATENT DOCUMENTS 4,855,077 8/1989 Shikinami et al. .................. 524/401

*Primary Examiner*—Paul R. Michl
*Assistant Examiner*—LaVonda R. DeWitt
*Attorney, Agent, or Firm*—Jordan and Hamburg

[57] ABSTRACT

The invention relates to a method of improving the electric conductivity of resin. The method comprises compounding (A) a macromolecular compound obtained by crosslinking a polyether polyol and (B) a soluble electrolyte salt into matrix resin. The invention insures a marked improvement in the electric conductivity of resin without affecting its physical characteristics or causing an objectionable coloration.

7 Claims, No Drawings

METHOD FOR IMPROVING THE ELECTRIC CONDUCTIVITY OF RESIN

BACKGROUND OF THE INVENTION

The present invention relates to a method of enhancing the electric conductivity of resin and more particularly to a method of enhancing the electric conductivity of resin products.

The representative prior art technology for improving the electric conductivity of resin products comprises incorporating (compounding) carbon black, carbon fiber, conductive mica or the like into the molding material resin.

However, this technology does not insure a sufficient improvement in conductivity unless a conductive substance, such as carbon black, is used in a substantial proportion but such practice adversely affects the physical properties of resin products. Furthermore, the resulting resin products are not attractive in appearance because of blackish or other coloration and, hence, can claim only limited application.

SUMMARY OF THE INVENTION

The object of the present invention is to overcome the above-mentioned disadvantages of the prior art and provide a method for achieving a remarkable improvement in the electric conductivity of resin products without adversely affecting their physical properties or coloring them.

The method according to the present invention is characterized in that a macromolecular compound obtained by crosslinking a polyether polyol and a soluble electrolyte salt are compounded into a matrix resin.

The macromolecular compound and the soluble electrolyte salt may be independently incorporated in the matrix resin. Alternatively, a complex compound prepared from such macromolecular compound and soluble electrolyte salt beforehand may be incorporated in the matrix resin.

DETAILED DESCRIPTION OF THE PREFERRED EMBODIMENTS

The resin whose electric conductivity is to be enhanced in accordance with the present invention is a resin having a high surface resistivity such as, inter alia, polyolefin resins such as polyethylene, polypropylene, etc., ABS resin, acrylic resin, polyamide resin, polyvinyl chloride resin, polycarbonate resin, polyacetal resin and phenolic resin.

The macromolecular compound which is compounded, either as it is or as a component of said complex compound, in a matrix resin is a compound which can be obtained by crosslinking a polyether polyol as mentioned above.

The polyether polyol mentioned above can be prepared by polymerizing an active hydrogen compound with an alkylene oxide.

The active hydrogen compound includes, inter alia, monohydric alcohols such as methanol, ethanol, etc., dihydric alcohols such as ethylene glycol, propylene glycol, 1,4-butanediol, etc., polyhydric alcohols such as glycerin, trimethylolpropane, sorbitol, sucrose, polyglycerin, etc., amine compounds such as monoethanolamine, ethylenediamine, diethylenetriamine, 2-ethylhexylamine, hexamethylenediamine, etc.; and phenolic active hydrogen compounds such as bisphenol A, hydroquinone and the like. Preferred are alcohols.

The alkylene oxide mentioned above includes, inter alia, oxides of α-olefins containing up to 9 carbon atoms, such as ethylene oxide, propylene oxide, 1,2-epoxybutane, 1,2-epoxypentane, 1,2-epoxyhexane, 1,2-epoxyheptane, 1,2-epoxyoctane, 1,2-epoxynonane, etc., oxides of α-olefins containing 10 or more carbon atoms, styrene oxide, and so on. Preferred are oxides of α-olefins containing, at most, 20 carbon atoms.

The catalyst for use in the polymerization reaction of such an active hydrogen compound with such an alkylene oxide includes basic catalysts such as sodium methoxide, sodium hydroxide, potassium hydroxide, lithium carbonate, etc., acid catalysts such as boron trifluoride, and amine catalysts such as trimethylamine, triethylamine and the like. The amount of the catalyst is virtually optional.

In polymerizing the active hydrogen compound with the alkylene oxide, the distribution of alkylene oxide in the polymer is virtually optional, thus being block or random.

The method of crosslinking the polyether polyol may, for example, be the isocyanate crosslinking method or the ester crosslinking method.

The crosslinking agent for the former method includes, among others, 2,4-tolylene diisocyanate (2,4-TDI), 2,6-tolylene diisocyanate (2,6-TDI), 4,4'-diphenylmethane diisocyanate (MDI), hexamethylene diisocyanate (HMDI), isophorone diisocyanate, triphenylmethane diisocyanate, tri(isocyanatophenyl) thiophosphate, lysine ester triisocyanate, 1,8-diisocyanato-4-isocyanatomethyloctane, 1,6,11-undecane triisocyanate, 1,3,6-hexamethylene triisocyanate, bicycloheptane triisocyanate, HMDI dimer (biuret), HMDI trimer (isocyanurate), trimethylolpropane-TDI (3 moles) adduct, etc., inclusive of various mixtures thereof. The crosslinking agent for the ester crosslinking method includes, among others, polycarboxylic acids such as malonic acid, succinic acid, maleic acid, fumaric acid, adipic acid, sebacic acid, phthalic acid, isophthalic acid, terephthalic acid, itaconic acid, trimellitic acid, pyromellitic acid, dimer acid, etc., lower alkyl esters of those polycarboxylic acids, such as the corresponding monomethyl esters, dimethyl esters, monoethyl esters, diethyl esters, monopropyl esters, dipropyl esters, monobutyl esters, dibutyl esters, etc., and acid anhydrides of said polycarboxylic acids.

In the isocyanate crosslinking method, typically an isocyanate is mixed with a polyether polyol in an NCO/OH ratio of 1.5 to 0.5 and the reaction is conducted at a temperature of 80° to 150° C. for 1 to 5 hours.

In the ester crosslinking reaction (for example, esterification or transesterification), a polyether polyol is mixed with a polycarboxylic acid or a lower alkyl ester or acid anhydride thereof typically in a functional group ratio of 1:2 through 2:1 and the reaction is conducted at 120° to 250° C. under $10^{-4}$ to 10 Torr.

The average molecular weight of the thus-obtained macromolecular compound is preferably sufficiently large from the standpoint of maintaining the inherent characteristics of the matrix resin intact, and is desirably in the range of 10,000 to 1,000,000.

The soluble electrolyte salt includes inorganic ion salts such as lithium chloride, lithium bromide, lithium iodide, lithium nitrate, lithium perchlorate, lithium thiocyanate, sodium bromide, sodium iodide, potassium thiocyanate, potassium iodide, lithium sulfonate, etc.

and organic ion salts such as organic sulfonates, organic phosphates and so on.

The macromolecular compound and the soluble electrolyte salt may be independently compounded in the matrix resin or a complex compound prepared from the macromolecular compound and soluble electrolyte salt beforehand may be compounded in the resin.

The proportions, by weight, of the macromolecular compound and the soluble electrolyte salt need not be adjusted according to whether they are independently incorporated or they are added in the form of said complex compound. Taking the amount of the matrix resin as unity (1), the proportion of the macromolecular compound is 0.001 to 0.7 and preferably 0.005 to 0.3. The proportion of the soluble electrolyte salt is 0.001 to 0.3 and preferably 0.01 to 0.1, with the amount of the macromolecular compound being taken as unity (1).

If required, a plasticizer, lubricant, stabilizer, colorant, filler, etc. may also be incorporated.

The method for compounding said macromolecular compound and soluble electrolyte salt into matrix resin may be any of the conventional methods such as the twin-screw extruder method, calendering and so on. The molding method for the manufacture of shaped articles is not limited, either. Thus, for example, injection molding, extrusion molding, calendering, compression molding, blow molding, SMC process, etc. can be mentioned. The shape of the article is also optional. Thus, it may be any desired form such as film, sheet, cord, pellet, powder and so on.

Ordinary synthetic resins generally have high surface resistivities not less than $10^{16}\,\Omega$ and, as such, are liable to be statically charged but the resin obtained by the method of the invention has a surface resistivity not more than about $10^{14}\,\Omega$ and, as such, is markedly antistatic and ion-conductive. Moreover, its performance characteristics are well maintained over a long period.

Furthermore, the resin produced by the method of the invention is similar to the matrix resin free of the macromolecular compound and soluble electrolyte salt in appearance and general nature and can be molded in the same way as the latter. Therefore, the method of the present invention represents a great contribution to the related industries and users.

The following examples and comparative examples are further illustrative, but by no means limitative, of the present invention.

EXAMPLE 1

A vacuum kneader was charged with 100 parts (parts by weight; the same applies hereinafter) of polyethylene glycol with an average molecular weight of 5,000 (polyether polyol), 3.88 parts of dimethyl terephthalate (crosslinking agent) and 0.1 part of a 10% aqueous solution of potassium hydroxide flakes. The temperature was increased to 200° C. in a vacuum of 1 Torr and the reaction was conducted with the byproduct methanol being constantly removed for 3 hours to give a macromolecular compound. As determined by high performance liquid chromatography, the average molecular weight of this macromolecular compound was about 100,000.

Then, 20 parts of the above macromolecular compound was dissolved in 50 parts of distilled water and this aqueous solution was mixed with 20 parts of a 10% aqueous solution of lithium perchlorate followed by drying under reduced pressure to give a complex compound.

This complex compound was mixed with 100 parts of low-density polyethylene and the mixture was molded into a 1.0 mm-thick sheet by means of an extruder set to a cylinder temperature of 170° C. and a T-die temperature of 170° C.

The sheet was allowed to stand for one month and, then, heated at 80° C. for 30 minutes. The surface resistivity of the sheet was measured at 20° C. and 60% RH using Toa Dempa Kogyo ultrainsulation resistance meter SM-10E.

The results, as well as the results of appearance observation, are shown in Table 1.

EXAMPLE 2

Five parts of the macromolecular compound prepared in the same manner as in Example 1 was mixed with 0.5 part of lithium chloride and 100 parts of polypropylene and the mixture was molded into a 1.0 mm-thick sheet by means of an extrusion machine set to a cylinder temperature of 180° C. and a T-die temperature of 190° C.

The resulting sheet was evaluated as in Example 1. The results are shown in Table 1.

EXAMPLE 3

A polyethylene glycol with an average molecular weight of 1,000 (polyether polyol) was reacted with 4,4'-diphenylmethane diisocyanate (crosslinking agent) in an NCO/OH ratio of 1.0 to give a macromolecular compound (average molecular weight; 200,000). Two parts of this macromolecular compound was mixed with 0.5 part of potassium thiocyanate, 100 parts of polyvinyl chloride resin, 50 parts of dioctyl phthalate (plasticizer) and 2 parts of calcium stearate (stabilizer) and the mixture was molded into a sheet in the same manner as Example 1.

This sheet was evaluated as in Example 1. The results are shown in Table 1.

EXAMPLE 4

A bisphenol A-ethylene oxide adduct (average molecular weight: 3,000) (polyether polyol) was reacted with hexamethylene diisocyanate (as crosslinking agent) in an NCO/OH ratio of 1.0 to give a macromolecular compound (average molecular weight: 80,000). Ten parts of this macromolecular compound was mixed with 1.0 part of potassium iodide and 100 parts of ABS resin and the mixture was molded into a sheet by means of an extruder set to a cylinder temperature of 195° C. and a T-die temperature of 200° C. in a manner similar to Example 1.

The sheet was evaluated as in Example 1. The results are set forth in Table 1.

COMPARATIVE EXAMPLES 1 THROUGH 4

Without addition of the macromolecular compound and soluble electrolyte salt, the procedures described in Examples 1 through 4 were otherwise repeated to manufacture sheets from the respective resins.

The sheets were evaluated as in Example 1. The results are set forth in Table 1.

TABLE 1

| | Surface resistivity (Ω) | Appearance of shaped article (sheet) |
|---|---|---|
| Example | $5.0 \times 10^{14}$ | Good |
| Comparative Example 1 | $\geqq 2 \times 10^{16}$ | Good |
| Example 2 | $6.0 \times 10^{14}$ | Good |

TABLE 1-continued

| | Surface resistivity (Ω) | Appearance of shaped article (sheet) |
|---|---|---|
| Comparative Example 2 | $\geqq 2 \times 10^{16}$ | Good |
| Example 3 | $5.8 \times 10^{14}$ | Good |
| Comparative Example 3 | $\geqq 2 \times 10^{16}$ | Good |
| Example 4 | $5.2 \times 10^{14}$ | Good |
| Comparative Example 4 | $\geqq 2 \times 10^{16}$ | Good |

What is claimed is:

1. A method of producing a resin of improved electric conductivity which comprises compounding into a matrix resin (A) a macromolecular compound obtained by crosslinking a polyether polyol and (B) a soluble electrolyte salt.

2. A method according to claim 1 wherein said macromolecular compound and said soluble electrolyte salt are independently compounded into matrix resin.

3. A method according to claim 1 which comprises preparing a complex compound from said macromolecular compound and soluble electrolyte salt beforehand and compounding the complex compound into matrix resin.

4. A method according to claim 1 wherein said polyether polyol is a compound obtained by polymerizing an active hydrogen compound with an alkylene oxide.

5. A method according to claim 1 wherein said polyether polyol is crosslinked by isocyanate crosslinking or ester crosslinking.

6. A method according to claim 1 wherein said macromolecular compound has an average molecular weight of 10,000 to 1,000,000.

7. A method according to claim 1 wherein the proportion of said macromolecular compound to matrix resin is 0.001:1 through 0.7:1 by weight and the proportion of said soluble electrolyte salt to said macromolecular compound is 0.001:1 through 0.3:1 by weight.

* * * * *